United States Patent [19]

Wieserman et al.

[11] Patent Number: 4,788,176
[45] Date of Patent: Nov. 29, 1988

[54] ADSORBENT COMPRISING METAL OXIDE/HYDROXIDE PARTICLES REACTED WITH ONE OR MORE PHOSPHOROUS-CONTAINING MATERIALS HAVING SELECTED ORGANIC RADICALS ATTACHED THERETO

[75] Inventors: Larry F. Wieserman; Karl Wefers, both of Apollo; Kathryn Cross, Murrysville; Edward S. Martin, New Kensington, all of Pa.

[73] Assignee: Aluminum Company of America, Pittsburgh, Pa.

[21] Appl. No.: 23,423

[22] Filed: Mar. 9, 1987

Related U.S. Application Data

[63] Continuation-in-part of Ser. No. 946,870, Dec. 29, 1986, abandoned.

[51] Int. Cl.$^4$ ............................................. B01J 20/22
[52] U.S. Cl. .................................................... 502/401
[58] Field of Search ............... 502/162, 208, 214, 355, 502/401, 407, 415, 425; 55/67; 210/198.2, 198.3; 427/220

[56] References Cited

U.S. PATENT DOCUMENTS

| 3,013,904 | 12/1961 | Cupery | 428/329 X |
| 4,202,798 | 5/1980 | Johnson et al. | 502/213 X |
| 4,308,079 | 12/1981 | Venables et al. | 428/414 X |
| 4,382,016 | 5/1983 | Rickelton et al. | 502/401 X |
| 4,506,628 | 3/1985 | Stockel | 119/1 |

Primary Examiner—W. J. Shine
Attorney, Agent, or Firm—Andrew Alexander; John P. Taylor

[57] ABSTRACT

An active material is disclosed comprising metal oxide/hydroxide particles having chemically bonded to reactive sites on a surface thereof, a monolayer of a phosphorous-containing organic material comprised of a phosphorous-containing group and a carbon-containing group. The bond to the metal oxide/hydroxide surface is formed by reaction of the phosphorous-containing group with the metal oxide/hydroxide particle surface, so that the carbon-containing group of the material is oriented away from the metal oxide/hydroxide surface.

52 Claims, 7 Drawing Sheets pH of the 24-Hour Bayerite and Gamma Alumina Time Study as a Function of Aging Time

ADSORBENT COMPRISING METAL OXIDE/HYDROXIDE PARTICLES REACTED WITH ONE OR MORE PHOSPHOROUS-CONTAINING MATERIALS HAVING SELECTED ORGANIC RADICALS ATTACHED THERETO

CROSS REFERENCE TO RELATED APPLICATIONS

This application is a continuation-in-part of U.S. Ser. No. 946,870, filed Dec. 29, 1986.

BACKGROUND OF THE INVENTION

1. Field of the Invention

This invention relates to the product of the reaction of metal oxide/hydroxide particles with a monolayer of one or more phosphorous-containing organic materials having selected reactive sites thereon to form an active material useful as an adsorbant.

2. Description of the Related Art

Analytical and industrial adsorbents made from organic resins suffer from poor physical strength, poor thermal stability, high cost, solvent swelling, and low capacity. Adsorbents made from metal oxides such as silica exhibit poor chemical stability at high pH. For many applications, in particular for high pressure and large separation columns, an adsorbent with high physical integrity, good chemical stability over high and low pH conditions, specific surface functionalities, good thermal stability, and low cost is needed for a wide range of applications.

Other metal oxides such as alumina have also been used as adsorbents because of the good physical integrity and low cost of alumina. The solubility of alumina in pH ranges between 4 and 9 is very low and the material is, therefore, chemically and physically stable in this pH range. However, beyond this pH range, on either the basic or acidic side, alumina becomes soluble in aqueous media and its physical strength and integrity degrade rapidly.

Modifications of metal oxide adsorbents such as alumina and aluminosilicates have been proposed. Stockel U.S. Pat. No. 4,506,628 teaches the formation of an adsorbent animal litter utilizing alumina, aluminosilicates, or coal residues as the substrate intimately mixed with monomers containing acid functionalities which polymerize in situ. The monomer, such as vinyl phosphonic acid, together with a redox catalyst, is mixed with a pliable dough formed from alumina and water and extruded into pellets which harden as the monomer polymerizes.

Modified alumina has also been used in the formation of catalysts, Johnson et al U.S. Pat. Nos. 4,202,798 and 4,251,350 describe the formation of a hydrocarbon hydrotreating catalyst formed by contacting alumina with a phosphorous-containing acid compound such as phenylphosphonic acid and then calcining the phosphorous-containing hydrous alumina. The calcined alumina is then treated with at least one metal-containing compound and again calcined to form the catalyst product.

In addition, Cupery U.S. Pat. No. 3,013,904 discloses a substrate having an organic polymer containing pentavalent phosphorous bonded thereto. Coatings of phosphorous-containing organic polymers are applied over coatings of positively charged colloidal metal oxides applied to negatively charged substrates. The thickness of the combined colloidal oxide and polymer layers on a substrate is less than 100 millimicrons.

Venables et al U.S. Pat. No. 4,308,079 teaches the treatment of an aluminum oxide surface of a aluminum substrate with a monomolecular layer of an amino phosphonate compound such as nitrilotris (methylene) triphosphonic acid to retard hydration of the aluminum oxide to provide a more stable microporous surface which is particularly suited to commercial adhesives. The presence of the hydrated oxide is said to interfere with the formation of a satisfactory bond between the adhesive and the oxide, while the phosphonate treatment is said to inhibit the conversion of the oxide to hydroxide without interfering with subsequent bonding of the adhesive to the oxide.

SUMMARY OF THE INVENTION

An active material is provided comprising a metal oxide/hydroxide particle having chemically bonded to reactive sites on the surface thereof a monomolecular layer of one or more types of phosphorous-containing organic molecules. The organic molecule is comprised of a phosphorous-containing group capable of forming a chemical bond with the reactive sites on the metal oxide/hydroxide particle and a carbon-containing group or site oriented away from the surface of the metal oxide/hydroxide particle and capable of functioning as the active component or site of the molecule.

It is, therefore, an object of this invention to provide an active material suitable for use as an adsorbent comprising one or more types of phosphorous-containing organic molecules bonded to the surface of a metal oxide/hydroxide particle.

It is another object of this invention to provide an active material suitable for use as an adsorbent stable at extended pH ranges and insoluble in aqueous media ranges comprising a monomolecular layer of one or more types of phosphorous-containing organic molecules bonded to the surface of a metal oxide/hydroxide particle.

It is yet another object of this invention to provide an active material suitable for use as an adsorbent stable at extended pH ranges of from 1 to 14 and insoluble in aqueous media ranges comprising a monomolecular layer of one or more types of phosphorous-containing organic molecules chemically bonded to the surface of a metal oxide/hydroxide particle wherein each of the organic molecules is further comprises of a carbon-containing group oriented away from the surface of the metal oxide/hydroxide particle and capable of functioning as the active component of the molecule.

It is a further object of this invention to provide an active material suitable for use as an adsorbent stable at extended pH ranges of from 1 to 14 and insoluble in aqueous media ranges comprising a monomolecular layer of one or more types of phosphorous-containing organic molecules wherein the phosphorous-containing group on the molecule is chemically bonded to the surface of a metal oxide/hydroxide particle and the molecule is further comprised of a carbon-containing group oriented away from the surface of the metal oxide/hydroxide particle and capable of functioning as the active component of the molecule.

It is yet a further object of this invention to provide a process for making such an active material suitable for use as an adsorbent which comprises chemically bonding to the surface of a metal oxide/hydroxide particle a monomolecular layer of one or more types of phoporous-containing organic molecules wherein each of the organic molecules is further comprised of a carbon-containing group oriented away from the surface of the metal oxide/hydroxide particle and capable of functioning as the active component of the molecule.

It is a further object of this invention to provide a process of making such an active material suitable for use as an adsorbent stable at extended pH ranges and insoluble in aqueous media.

It is another object of this invention to provide a process for making such an active material suitable for use as an adsorbent stable at pH ranges of from 1 to 14.

It is yet another object of this invention to provide a process for making an active material suitable for use as an adsorbent stable at pH ranges of from 1 to 14 by treatment of the surface of a metal oxide/hydroxide particle with an organic phosphorous-containing compound such as phosphonic or phosphinic acid in an amount sufficient to form a monomolecular layer on the metal oxide/hydroxide particle and to render the metal oxide/hydroxide particle insoluble in an aqueous media.

These and other objects of this invention will be obvious from the following description and accompanying drawings.

DETAILED DESCRIPTION OF THE INVENTION

Figure 1:
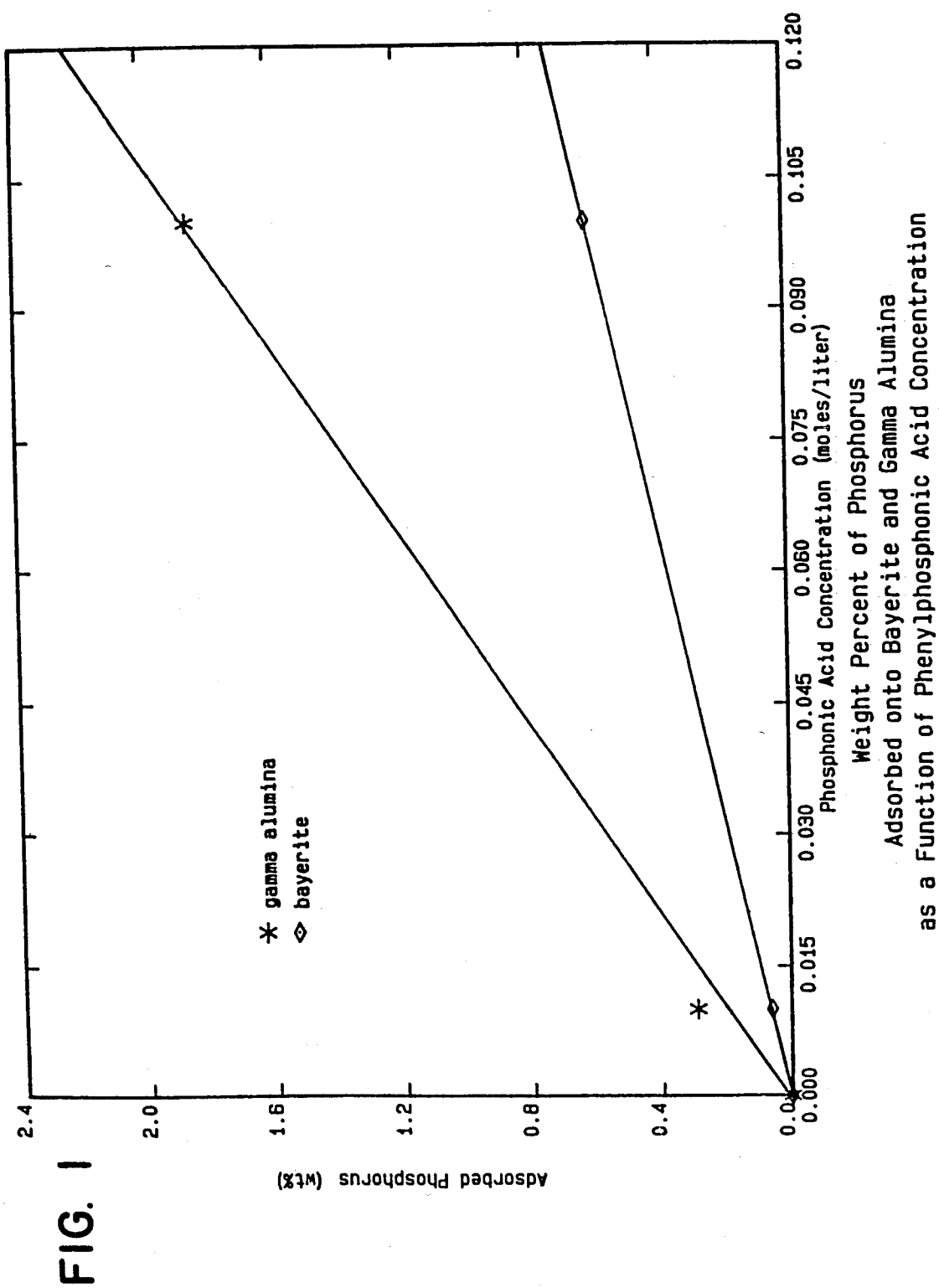
FIG. 1 is a graph showing the weight percent of phosphorous adsorbed to forms of aluminum oxide/hydroxide as a function of acid concentration.

In accordance with the invention, the active material comprises a metal oxide/hydroxide particle having chemically bonded thereto a substantially monomolecular layer of a phosphorous-containing organic material wherein the organic molecule having the phosphorous-containing group is further comprised of a carbon-containing group oriented away from the surface of the metal oxide/hydroxide particle and capable of functioning as the active component of the molecule. This active material is suitable for use as an adsorbent which is stable over a large pH range, i.e., from 1-14, and which, unlike at least some of the metal oxide/hydroxides useful as the support material, is insoluble in aqueous media.

The active material also may be useful for: an analytical and prepative-scale chromatographic support; an ion exchange medium; a coupling agent for biological materials such as enzymes, whole cells, yeasts, proteins, microbes, pharmaceuticals—including timed-release drugs, and vaccines; stabilization of inorganic membranes used at high and low pH; coatings for piezoelectric crystals; spacer molecules for holding metal oxide particles apart; coatings for inorganic fillers and flame-retardants in polymers; coatings for inhibiting cation or anion adsorption (such as $F^-$ adsorption on alumina); formation of hydrophobic surfaces on metal oxides to control wetting and dispersion properties in fluid media; controlling surface charge in fluid media; promoters for adhesive bonding of metals, ceramics and polymers; coupling agents for immobilizing optically active molecules (chirality) for selective adsorption of optically active compounds (d or l isomers); surface modification for passivating surfaces of biological implants (e.g., bones, joints, teeth); additives to medicinal products (extenders, coloring agents, flavorings for toothpaste, creams); improve bonding between electrical insulation and metal conductor (decrease delamination from weathering); controlling the abrasive properties of metal oxides powders; complexing agents for catalytically active metals for improved metal dispersion; producing stain and wear resistant coatings for plastic, concrete, or soft metal wear surfaces; selective adsorption of toxic liquids or gases without adsorbing water; coupling agents for coloring polymers and paints; preservative coatings for natural products such as wood, straw, and stone to increase surface hardness, stain resistance, and color fastness; coating to increase the efficiency of photon radiation by enhanced absorption and/or light scattering; coating with bacteriostatic properties for pharmaceutical products, treating fabrics, and wood (e.g., treating wood shingles to inhibit formation of mold, mildew, and rot); flocculating agents for colloidal dispersions; metal chelating agents; an additive to polish and waxes as extender and anti-wetting agent. Further, the active material also may be useful in diagnostic testing devices or processes or in therapeutic devices or processes. The active material may be applied to membranes such as inorganic membranes and may be used in reverse osmosis dialysis and ultrafiltration.

The use of the term "active material" is intended to define an organic molecule comprising a monomer, oligomer or short chain polymer having a phosphorous-containing group, preferably at the end of the molecule, capable of bonding to the metal oxide/hydroxide support and having one or more sites thereon, preferably at the opposite end of the molecule, which may be used for the coupling, bonding, or adsorbing, etc. of atoms, ions or other molecules thereto, e.g., when the active material functions as an adsorbent, the active material will have sites available on the molecule to which the material to be adsorbed will be attracted.

The use of the term "metal oxide/hydroxides" herein is intended to define a broad spectrum of oxides ranging from those which may contain few hydroxides, e.g., activated or calcined forms of aluminum oxide (alumina) to more hydrated froms which may comprise mainly hydroxide, e.g., $Al(OH)_3$. It has been found, however, that the metal hydroxide form, rather than the metal oxide form, provides a better bond with the phosphorous-containing group on the organic molecule with which it is reacted. However, for certain applications, dehydrated or activated forms of the metal oxide/hydroxide may be preferred due to the higher surface area of such particles. For example, when aluminum oxide/- hydroxide is used, the hydrated form will be preferred, e.g., gibbsite, bayerite, or boehmite will be preferred when a large external surface area is desired and activated alumina will be preferred when it is desirous that the metal oxide/hydroxide have a high internal surface area.

As presently understood, the metal oxide/hydroxides suitable for use in the present invention usually require hydroxyl groups on the surface thereof for purposes of providing bonding sites for the phosphorous-containing organic materials. For example, when the particulate material is alumina, hydroxyl groups on the surface of the alumina react with the phosphorous-containing group or groups of the organic molecule, i.e., with the —POOH acid group of the phosphonic or phosphinic acid. When using an organic solvent, particularly where the solvent is immiscible with water, a monolayer of hydroxyl groups is provided on the alumina particles for purposes of reacting to form a chemical bond with the phosphonic or phosphinic acid groups. It will be appreciated that if more than a monolayer of hydroxyl units is present on the alumina surface, such as hydroxyl units present as a result of water, this additional water layer can act to hinder the reaction. Thus, while it is preferred to have a maximum of a monolayer of hydroxyl units, less than a complete surface layer of hydroxyl units can be present on the metal oxide and such does not hinder reactivity.

Metal oxide/hydroxides which may be used as the support particle for reaction with the phosphorous-containing organic material include any metal capable of forming oxide/hydroxide selected from the class consisting of groups IB, IIA, IIB, IIIA, IVA, VA, IIIB, IVB, VB, VIB, VIIB and VIII, and combinations thereof. For example, the oxide/hydroxides of aluminum, magnesium, titanium, zirconium, iron, silicon, chromium, zinc, vanadium, and combinations of these may be used. Also, a core or center of iron oxide/hydroxide or other paramagnetic or diamagnetic material may be used with a coating of a metal compound to take advantage of the magnetic properties of of the iron oxide/hydroxide as an adsorbent. It should be noted that by use of the term "metal", it is intended to include not only the traditional metals, but also materials sometimes referred to as metalloids such as Si, Se, B, As and Te and to exclude the remaining elements referred to as nonmetals in the periodic table. In addition, oxides/hydroxides of the lanthanide series, as well as oxides/hydroxides of thorium and uranium in the actinide series, may be used as the support particle.

While the invention is primarily directed to the use of metal oxide/hydroxide particles as support materials for reaction with the phosphorous-containing organic molecules to form the active material, it is within the purview of this invention that other metal compounds could be used in substitution for the metal oxide/hydroxides such as metal silicates, oxalates, phosphates, sulfates, carbonates, apatites, hydrotalcites, zeolites, kaolin, clays and chromates as well as combinations of such materials or combinations of any of such materials with the preferred metal oxide/hydroxide support materials.

With respect to the metal oxide/hydroxides used in the present invention, it is preferred that they are provided in particulate form for certain applications. When the use is adsorbents, particle sizes can range from as low as 50 Angstroms to provide large external surfaces and up to 12 millimeters for large reactors. When the adsorbent base is alumina the particle size can be 1 to 200 microns. It will be appreciated that other uses, for example, flocculation, flame retardant in polymers, heterogeneous catalyst, can require different particle sizes. However, normally for adsorbent use, the particle size is greater than 1 micron. Typical particle size distributions, when the metal oxide/hydroxide particles comprise aluminum oxide/hydroxide (alumina), are 1, 3-6, 7-12, 10-18, 18-32, 32-63, and 50-200 microns.

With respect to particle size morphology of the metal oxide/hydroxides used in the invention, e.g., metal oxide/hydroxides such as alumina, or iron oxide, for purposes of the present invention, it is preferred that they have a pore size of 20 Angstroms to 10 microns in diameter. Further, it is preferred that the particles have a pore volume of 0.1 to 1.5 ml/g. With respect to purity, the level of impurity should be minimized depending on the end use. However, for adsorbents, for example, the metal oxide or metal compound should have a purity level of over 80%, preferably 95% or greater. Surface area of the particle is preferred to be high with typical surface areas for alumina, for example, being in the range of 0.10 to 600 $m^2/g$ and up to 1000 $m^2/g$ for other metal oxide/hydroxides such as silica.

To produce the active material comprising the metal oxide/hydroxide reacted with one or more types of phosphorous-containing organic molecules, the metal oxide/hydroxide, such as alumina, may be reacted with a phosphonic or phosphinic acid in an aqueous media at a temperature of from about 25° C. up to about 90° C., preferably about 50° C., for a period of from at least 0.1 to not more than 20 hours, and preferably from at least about 0.5 hours up to about 4 hours, at about 5°-150° C. using an initial acid concentration of at least about 0.0001 to 0.1 molar. In some instances higher concentrations may be desired. When the media is non-aqueous, the temperature range can be greatly extended. For example, it may range from 5° C. or lower to 200° C. or sometimes higher depending on the liquid medium.

In the present invention, the weight of the monolayer can range from about 0.01 to 90 wt.% calculated on the total weight of the coated metal oxide, and preferably the monolayer can range from about 4 to 50 wt.%, typically 5 to 20 wt.%. When the metal oxide/hydroxide particle is very small, the monolayer weight can be equal to or greater than the weight of the particle. For purposes of ensuring that a monolayer of phosphonated organic material is bonded to the metal oxide particles, the application should be carefully controlled. That is, a monolayer can be obtained, for example, by controlling the viscosity of the aqueous media, the time of exposure in the media, the concentration of phosphorous-containing organic material in the media, or the concentration of hydroxyl units on the metal oxide particles. In addition, to ensure a monolayer, after formation of the active material, it may be treated in an organic solvent, a basic or acidic solution, or combinations thereof. An example is $NaHCO_3/Na_2CO_3$ washing solution having a pH of about 10, to remove weakly adsorbed molecules on the particles. This ensures that all of the molecules remaining are bonded to the hydroxyl groups on the metal oxide/hydroxide surface and not to one another, thus assuring formation of the desired monomolecular layer stable over a wide range of pH.

The formula for the phosphonic acid useful in the practice of the invention may be written as $RPO(OH)_2$ while the phosphinic acid may be written as $RR'PO(OH)$ where R' may be hydrogen and both R and R' may each be comprised of 1–30, preferably 5–30, carbon-containing molecules such as an alkyl group. Other examples of groups which may comprise R and/or R' include long and short chain aliphatic hydrocarbons, aromatic hydrocarbons, carboxylic acids, aldehydes, ketones, amines, amides, thioamides, imides, lactams, anilines, pyridines, piperidines, anhydrides, carbohydrates, isocyanates, thiocyanates, esters, lactones, ethers, alkenes, alkynes, alcohols, nitriles, oximes, organosilicones, sulfur containing organic compounds, ureas, thioureas, perfluoro organic molecules, perchloro organic molecules, perbromo organic molecules and combinations of these groups.

The phosphorous-containing organic molecules such as listed above may also include inorganic groups substituted thereon such as halogens, nitrates, phosphates, phosphinates, phosphinites, phosphonates, quaternary ammonium salts, and the like. While it is preferred that the free end of the organic group extends away from the surface of the metal compound particle, it is within the scope of the present invention to provide, on the free end of the molecule, one or more functional groups. A functional group may be defined as the group on the molecule which enables the reactive material (comprising the phosphorous-containing organic material bonded to the metal oxide/hydroxide surface) to react with, attract, couple to, bond with, etc. other atoms, ions and/or molecules. Intermediate groups may be defined as the groups on the molecule which permit substitution or addition of groups or compounds to the R or R' groups after the monolayer has been formed on the oxide/hydroxide particle. Examples of intermediate groups include I, Cl, Br, CN, etc. The intermediate group permits the addition of groups or radicals which would not be compatible with or be destroyed during formation of the monolayer. Thus, this permits the addition of functional groups on the end of the R or R' group after the monolayer is formed. By attaching specific functional groups, either organic or inorganic, to the R and R' groups of the phosphonic and phosphinic acids, a wide variety of adsorbent selectivities and capacities are provided.

The functional groups attached to or contained within the free end can be selected from cation exchange functional groups and anion exchange functional groups such as —HSO₃, —N(CH₃)₃Cl, —COONa, —NH₂ and —CN, for example. The —HSO₃ functional group permits removal of cations such as $Cu^{+2}$, $Fe^{+2}$, $Co^{+2}$, $Cd^{+2}$, $Ca^{+2}$, $Sr^{+2}$, $Hg^{+2}$, $Pb^{+2}$, $Ba^{+2}$ and $Be^{+2}$ from aqueous media. The functional group, —CH₂N⁺(CH₃)₃Cl, permits removal of anions such as $HSO_4^-$, $ClO_3^-$, $NO_3^-$, $NO_2^-$, $HPO_4^-$, formate, citrate. Other examples of functional groups that may terminate the free end of the phosphonate bonded hydrocarbon chain include the following: a carboxyl group, e.g., a carboxymethyl group, a glucose group, a monoclonal antibody, a cyano group (—C≡N), a phenyl group, a diphenyl group, a tertiary butyl group, a sulfonic group, a benzyl sulfonic group, protein groups such as protein A (staphylococcal protein A), protein G, immunoglobulins and binders thereof, pharmaceutical compounds, yeasts, microbes, whole cells, enzyme groups, dye molecules, chelated metal groups, tag molecules and combination of these groups. Further, it should be noted that the carbon group can be a saturated or unsaturated carbon chain.

It will be noted that the R or R' groups are always monomers or oligomers. Preferably, the oligomers have a molecular weight of less than 2000. By the use of monomer herein is meant to include a chemical compound that can undergo polymerization. By oligomer is meant a polymer or polymer intermediate containing relatively few structural units, i.e., a polymer containing 2–4 monomers.

While we do not wish to be found by any particular theory of bonding, it is believed that when a metal oxide/hydroxide particle, for example, alumina, is brought into contact with the phosphonic or phosphinic acid a reaction or adsorption of the acid on the alumina takes place in which the aluminum and phosphorous atoms in the respective molecules are apparently bonded together through an oxygen atom as illustrated in the formulas below:

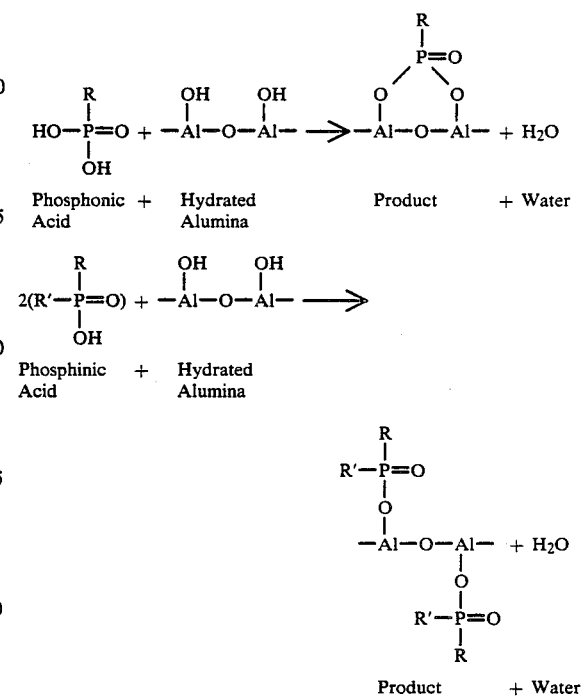

Note:
Aluminum ions may be an octrahedrally or tetrahedrally coordinated cation with or without coordination vacancies at or near the surface (external or within pore structures).

Thus it can be seen, using the above proposed model, that if all of the exposed hydroxyl groups on the surface of the alumina can be reacted with the phosphonic or phosphinic acid groups, the surface chemistry of the reacted alumina will be changed. Furthermore, the type of organic radical attached to the phosphonic or phosphinic acid can be tailored to achieve certain types of affinities to provide selectivity in the adsorption characteristics of the product. For example, when an alumina treated with a phosphonic or phosphinic acid having a octadecyl R group is used, the following type of selectivity can be achieved. For example, p-nitroaniline, methyl benzoate, phenetole, and o-xylene under chromatographic conditions can be selectively adsorbed on such a reactive material in accordance with the present invention.

Figure 8:
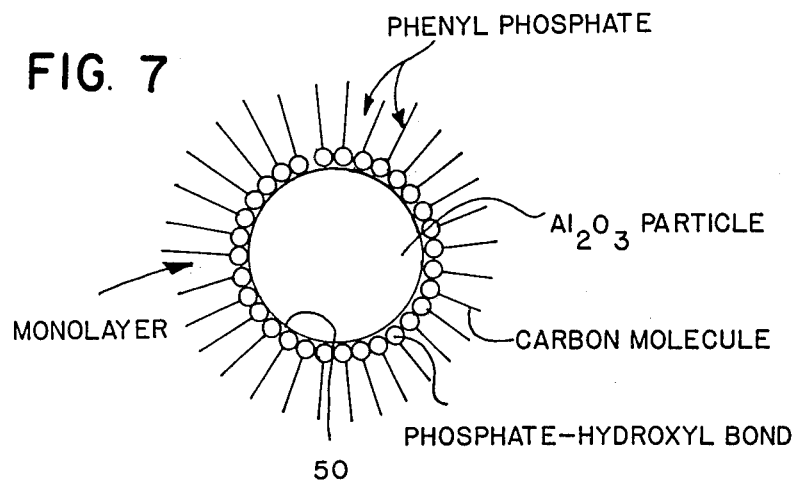
FIG. 8 is an illustration of a metal oxide/hydroxide particle having a monolayer of phosphorous-containing material thereon.

The chemical bonding of the phosphonic or phosphinic acid to the metal oxide/hydroxide particle, e.g. alumina particle, is illustrated in FIG. 8 wherein the center represents the alumina particle having a surface 50. The carbon-containing molecule is chemically bonded at one end to surface 50 by means of a phosphorous-oxygen-metal bond. As presently understood, it is preferred that the other or free end of the carbon-containing molecule extends away from the surface of the particle, as shown in FIG. 8. Further, it is important to control the application or bonding of the phosphonic or phosphinic acid to the metal oxide/hydroxide support so as to obtain a monolayer bonded to the metal oxide/hydroxide particle as illustrated in FIG. 8.

By "monolayer" or "monomolecular layer" is meant that 90%, and preferably 98%, of the phosphonic or phosphinic acid molecules are bonded to the metal oxide/hydroxide particle as a single layer of molecules. Thus, the application should be controlled so as to prevent the R or R' groups from bonding to each other to form weakly adsorbed multilayers which would then provide further hydroxyl units, i.e., —POOH units directed away from and not bonded to the surface of the metal oxide/hydroxide particles, thereby defeating the purpose of the invention, for example, when it is used for an adsorbent. The thickness of the phosphorous-containing bonded organic monolayer is in the range of 10–5000 Angstroms and preferably 20 to 500 Angstroms.

As noted earlier, while it is desired to avoid organic polymers where the chain has repeating phosphorous-containing groups which can bond to the metal oxide particle surface, oligomers having preferably a single phosphorous-bonding group are utilized. The single phosphorous-bonding group permits the oligomer to have a free end which extends away from the metal oxide particle surface. Additionally, the monomer or oligomer comprising the monolayer may have reactive sites which can permit crosslinking so as to polymerize monomers or oligomers already bonded to the surface of the metal oxide particle.

In the present invention, particularly when the end use is an adsorbent, it is preferred that the monomer or oligomer used is at least a five-carbon chain. The chain can have 20 to 30 or more carbons, as noted earlier. The longer chains preferably are used in the initial bonding or loading of the metal oxide particle with the phosphorous-containing carbon material. However, because of the pores and fissures that can be present on the metal oxide particle, particularly those having high surface area, often all the surface hydroxyl units are not reacted because of the inability of the longer chain phosphorous-containing organic material to reach or to diffuse into the pores and fissures. Thus, to inert or block remaining reactive sites, short-chain monomers or oligomers, e.g., less than 6 carbon molecules per chain, can be used. In this way, all of the reactive sites are capped or blocked. That is, for capping off the reactive sites, short-chain monomers can be used. For example, an alumina treated with a high molecular weight phosphonic or phosphinic acid, e.g. an n-heptadecylphosphonic acid, may be further treated with a low molecular weight phosphonic acid, e.g., methylphosphonic acid, to treat any remaining unreacted alumina surface areas.

The following examples will serve to further illustrate the practice of the invention.

EXAMPLE I

High purity bayerite and gamma alumina were used as supports. The nitrogen BET surface area was 19 and 65 m$^2$/g for bayerite and gamma, respectively.

Both the bayerite and gamma aluminas, having an average particle size of about 2 microns, were dried in a 110° C. drying oven and 10 gram samples were weighed into a number of glass sample vials.

To each of four vials containing 10 gram samples of gamma alumina were added, respectively, 100 ml of 0.1, 0.01, 0.001, and 0.0001 molar solutions of phenylphosphonic acid formed by diluting a 0.1 molar phenylphosphonic acid solution with deionized and distilled water. Molar concentrations of 0.01, 0.001 and 0.0001 gave a monolayer but cover less than all of the surface area available on the particles. A molar concentration of 0.1 was sufficient to provide a monolayer on most of the surface area of the particles. Higher than 0.1 molar would have resulted in multilayering, which is undesirable. To a fifth 10 gram sample of gamma alumina was added 100 ml of deionized and distilled water. Five more samples were similarly prepared using 10 gram bayerite samples instead of gamma alumina. The ten samples were shaken and then allowed to age for 24 hours. The contents of the sample containers were then vacuum filtered through Whatman 42 filter paper. The surface modified alumina samples were placed in clean vial and dried in a 110° C. drying oven. The phosphorus content of each of the samples was determined by direct current plasma spectroscopy.

The results are tabulated in Table 1 and plotted in the graph of FIG. 1. It can be seen that there is a significant increase in the amount of phosphorus present on the surface of the bayerite and gamma alumina samples aged in the 0.1 molar solution of phenyl-phosphonic acid compared to less concentrated amounts. Higher phosphorus content of gamma alumina compared to bayerite is because of its higher surface area.

TABLE 1

| Sample Number | Alumina Form | Acid Conc. (M) Molar | Adsorbed Phosphorus Wt. % |
|---|---|---|---|
| 1 | bayerite | 0.0000 | 0.00 |
| 2 | bayerite | 0.0001 | 0.01 |
| 3 | bayerite | 0.001 | 0.01 |
| 4 | bayerite | 0.01 | 0.06 |
| 5 | bayerite | 0.1 | 0.61 |
| 6 | gamma | 0.0000 | 0.00 |
| 7 | gamma | 0.0001 | 0.01 |
| 8 | gamma | 0.001 | 0.04 |
| 9 | gamma | 0.01 | 0.29 |
| 10 | gamma | 0.1 | 1.85 |

EXAMPLE II

Another group of 10 gram samples of gamma and bayerite aluminas were used and to each sample was added 100 ml of 0.1 molar phenylphosphonic acid. Each sample vial was covered and shaken and then allowed to age for a predetermined time period followed by, filtration, drying, and measurement similar to that previously described in Example 1 to determine the phosphorus content on the alumina sample with respect to contact time between the respective alumina samples and the phenylphosphonic acid. These results are tabulated in Table 2 and illustrated in the graph of FIG. 2.

Figure 3:
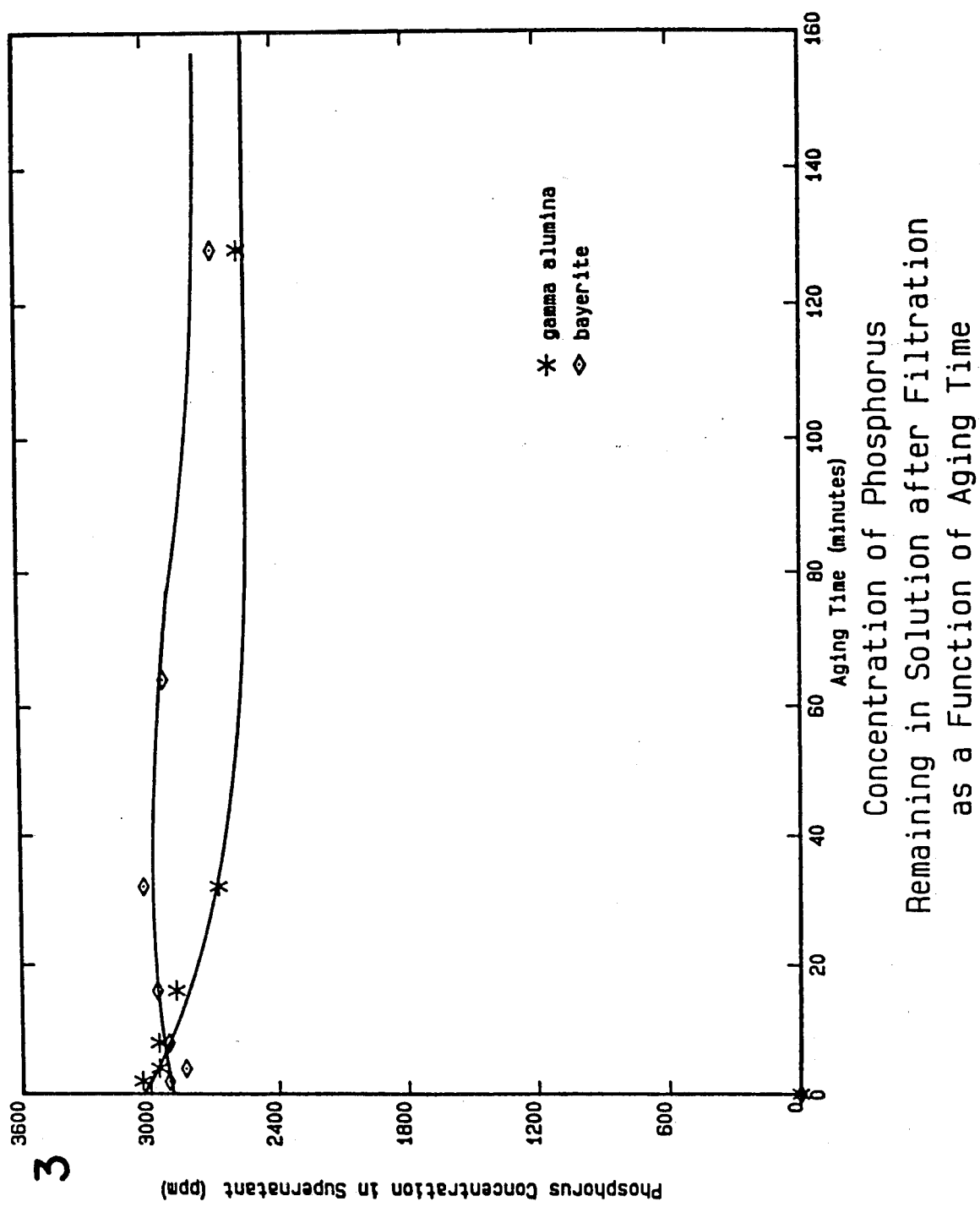
FIG. 3 is a graph showing the concentration of phosphorous remaining in solution after filtration as a function of aging time.
Figure 6:
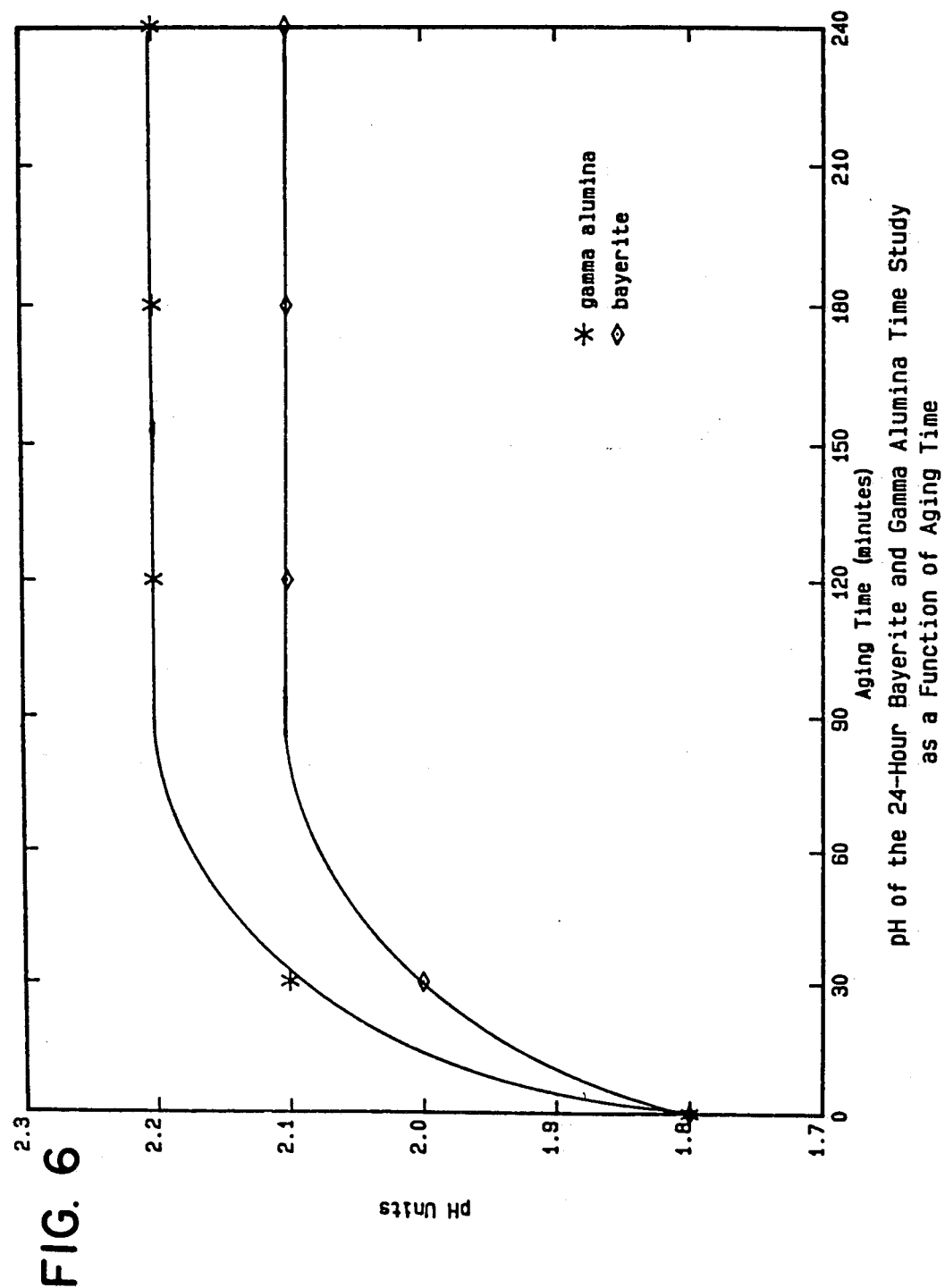
FIG. 6 is a graph of the pH of the solution plotted against time as an indication of phosphorous adsorption on aluminum oxide/hydroxide particles.
Figure 7:
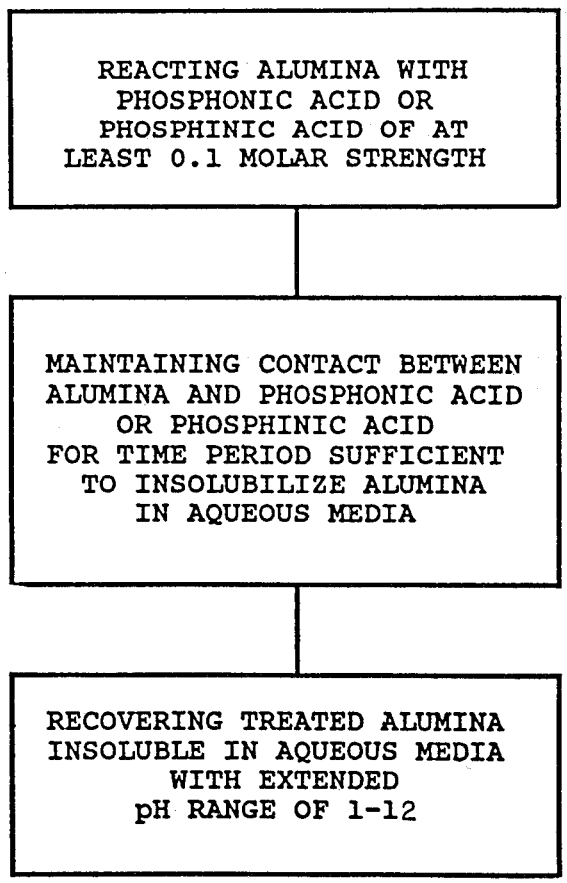
FIG. 7 is a flowsheet illustrating the invention.

The filtrate for the alumina samples aged for various time periods was also analyzed for phosphorus content. The concentration of phosphorus in the filtrate of the bayerite and gamma alumina samples aged for various amounts of time is plotted in FIG. 3. The pH change of the respective solution for the gamma and bayerite samples aged for 24 hours was also monitored and the change in pH with respect to time was plotted in FIG. 6 to illustrate yet another way of monitoring the amount of chemically adsorbed phenylphosphonic acid on the aluminas. It is seen that the solution containing the gamma alumina sample shows a rapid rise in pH between 0 and 30 minutes and then a slow increase until 120 minutes when it begins to decrease slightly. The pH of the solution containing the bayerite alumina sample shows linear increase from 0 to approximately 150 minutes and then decreases slightly. It should be noted that aluminas other than bayerite and gamma alumina, e.g., gibbsite, boehmite, eta, chi, rho, delta, kappa and alpha aluminas, may be used as supports.

TABLE 2

| Sample Number | Alumina Type | Time in Minutes | Adsorbed Phosphorus Wt. % |
|---|---|---|---|
| 1 | bayerite | 2 | 0.12 |
| 2 | bayerite | 4 | 0.11 |
| 3 | bayerite | 8 | 0.12 |
| 4 | bayerite | 16 | 0.12 |
| 5 | bayerite | 32 | 0.11 |
| 6 | bayerite | 64 | 0.13 |
| 7 | bayerite | 128 | 0.12 |
| 8 | bayerite | 256 | 0.38 |
| 9 | bayerite | 1440 | 1.31 |
| 10 | gamma | 2 | 0.72 |
| 11 | gamma | 4 | 0.62 |
| 12 | gamma | 8 | 0.65 |
| 13 | gamma | 16 | 0.67 |
| 14 | gamma | 32 | 0.62 |
| 15 | gamma | 64 | 0.63 |
| 16 | gamma | 128 | 0.65 |
| 17 | gamma | 256 | 0.80 |
| 18 | gamma | 1440 | 1.56 |

EXAMPLE III

To further illustrate the practice of the invention, 3 grams each of the filtered and dried gamma alumina samples from Example I, respectively contacted with 0.1, 0.01 and 0.0001 molar phenylphosphonic acid, were washed and filtered 3 times with 30 ml of distilled, deionized water. Filtered and dried 3 gram gamma alumina samples from Example II which had, respectively, been contacted with 0.1 molar phenylphosphonic acid for 8, 64, and 1440 minutes were similarly washed. All the washed samples were then placed into clean vials and dried in a 110° C. drying oven. The gamma alumina samples contacted with the 0.1 molar concentration phenylphosphonic acid were not wettable. They were also not affected by the washing.

Figure 2:
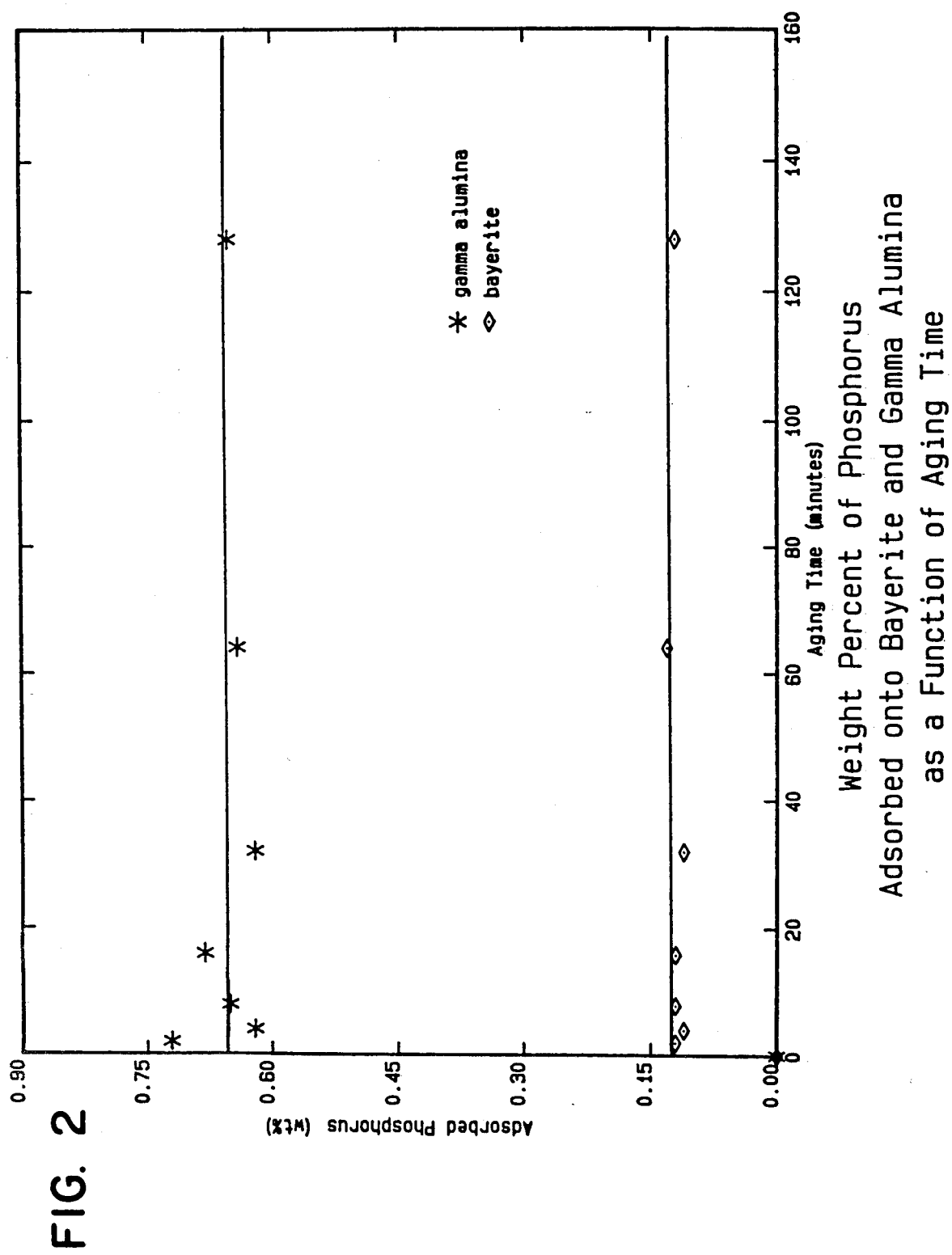
FIG. 2 is a graph showing the weight percent of phosphorous adsorbed to forms of aluminum oxide/hydroxide as a function of aging time.
Figure 4:
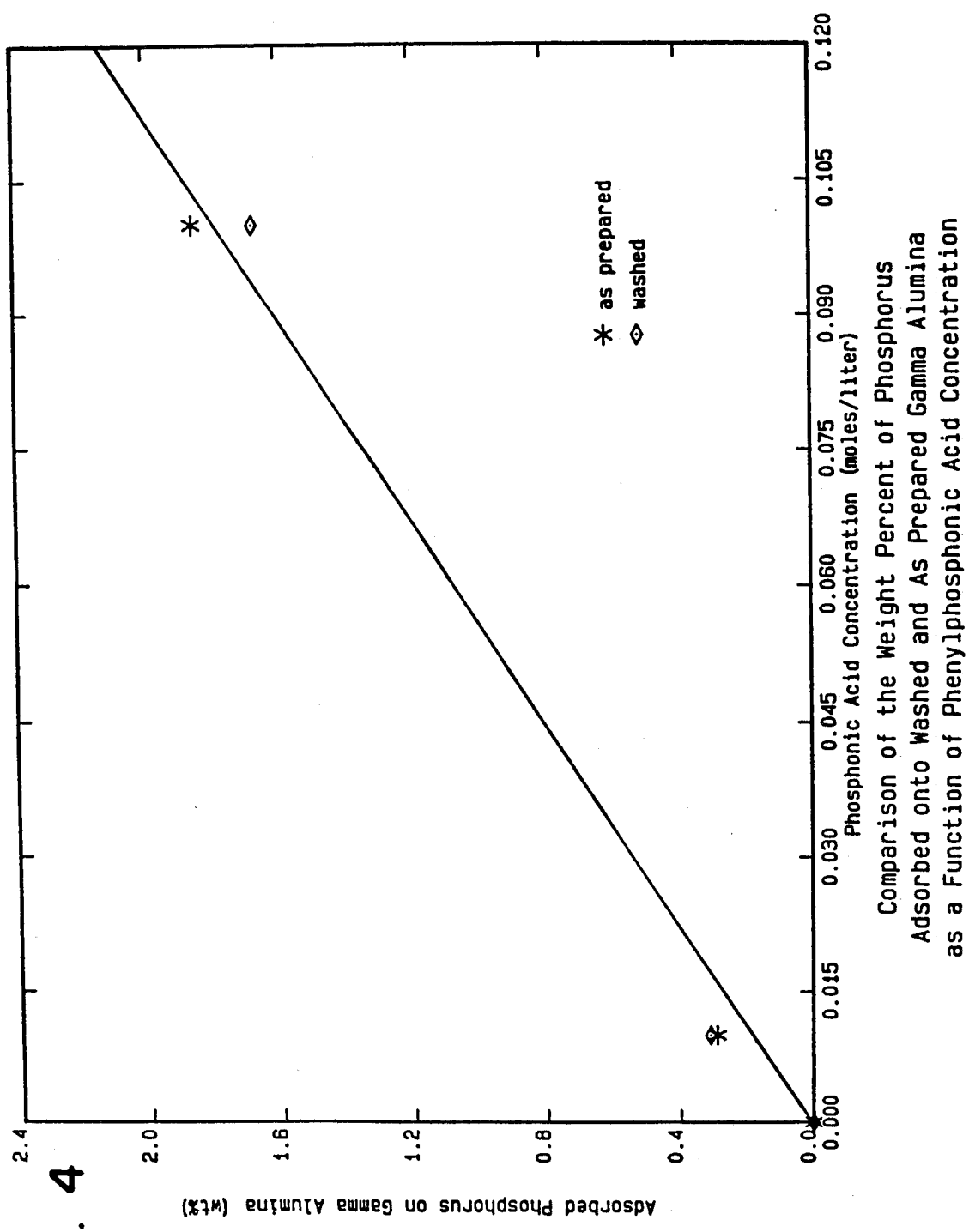
FIG. 4 is a graph showing the weight percent of phosphorous adsorbed to gamma alumina before and after washing as a function of acid concentration.
Figure 5:
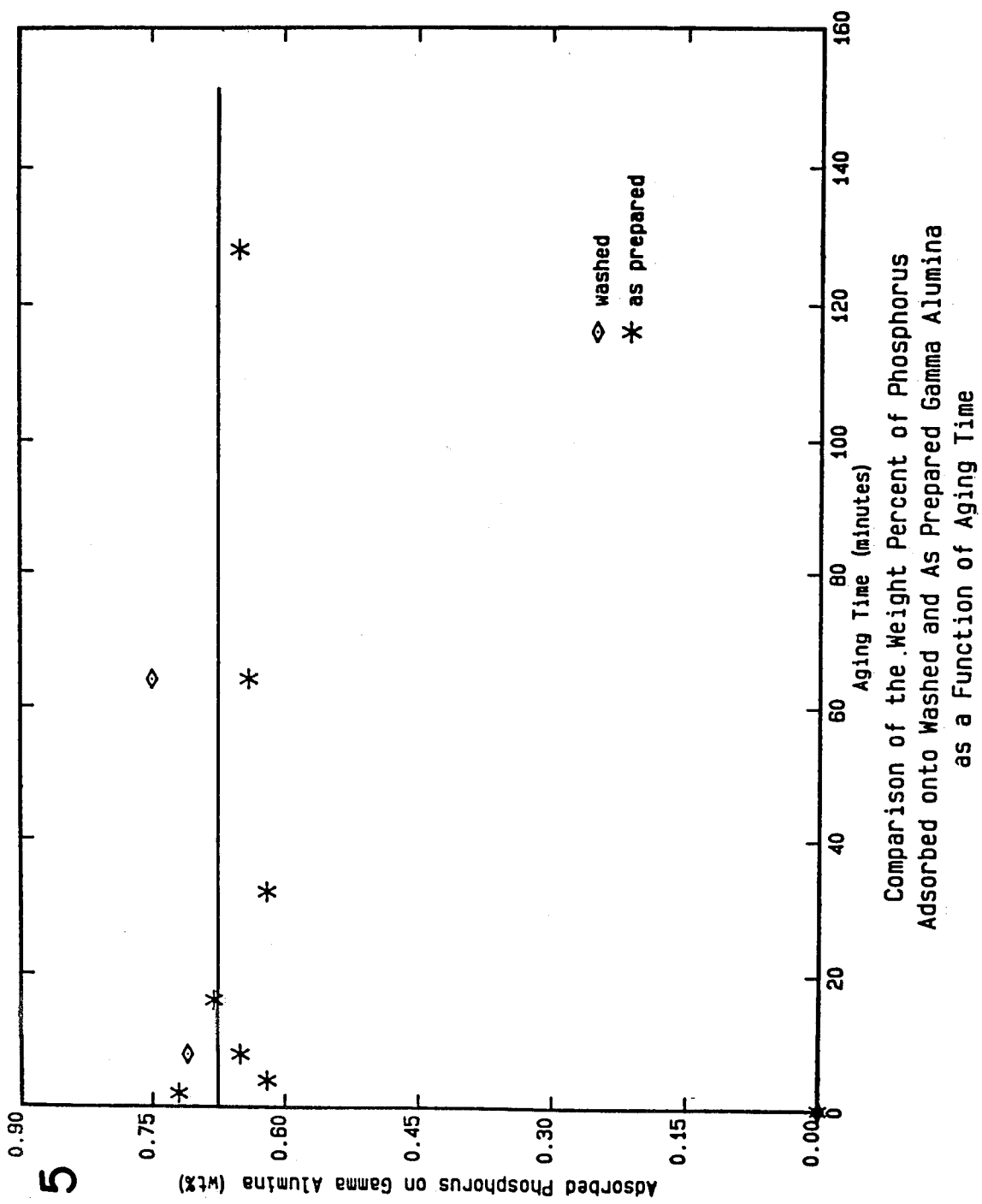
FIG. 5 is a graph showing the weight percent of phosphorous adsorbed to gamma alumina before and after washing as a function of aging time.

The results are respectively illustrated in FIGS. 4 and 5 in which the results from the washed samples are plotted in dotted lines superimposed on the respective solid line gamma curves for unwashed samples corresponding to the gamma curves respectively shown in FIGS. 1 and 2. It will be noted that the amount of phosphorus remaining on the treated alumina after washing is fairly comparable to the unwashed samples.

EXAMPLE IV

To illustrate the multiple treatment of alumina with more than one type of phosphonic or phosphinic acid, a solution of 0.1 molar n-heptadecylphosphonic acid was prepared by dissolving 3.8454 grams in 120 ml. of isopropanol at 45° C. Thirty grams of activated 7–12 micron alumina was weighed into this solution which was then shaken to mix and placed in an ultrasonic bath for 15 minutes. The mixture was vacuum filtered through Whatman #3 filter paper. The alumina was washed with 3 volumes of isopropanol and placed in an oven at 110° C. to dry. The unreacted sites on the surface of the alumina were then capped with methylphosphonic acid. A solution of 0.1 molar methylphosphonic acid was prepared by dissolving 1.1524 grams of methylphosphonic acid in 120 ml. of isopropanol at 45° C. The dried, n-heptadecylphosphonic acid loaded alumina was added to this, shaken to mix, and placed in an ultrasonic bath for 15 minutes. The alumina was then again filtered, washed and dried at 110° C.

Another alumina sample was then contacted with a 0.3 molar solution of n-heptadecylphosphonic acid dissolved in isopropanol under the same conditions and then capped as above with a 0.1 molar solution of methylphosphonic acid.

Both samples were analyzed on an IBM Instruments IR-98 Fourier Transform Infrared Spectrometer with 128 scans per spectrum at 4 cm−1 resolution. The spectra were plotted using a KBr spectrum as reference. The bands chosen for the n-heptadecylphosphonic acid calibration curves were the 2928 cm−1 asymmetric stretching band and the 1470 cm−1 bending band. The band at 1470 cm−1 is selected as the analytical wavelength because the value for its standard deviation is ten times less than the value for the band at 2928 cm−1. At this wavelength, the respective weight percent of n-heptadecylphosphonic acid loaded by treating the alumina with the 0.1 molar and 0.3 solutions was 6.88 and 24.85 wt.%, respectively.

Thus the invention provides a method for forming a reactive material capable of withstanding pH ranges of 1–14 and nonwettable in an aqueous media by reacting metal oxide/hydroxide particles with an organic phosphorous-containing compound such as a phosphonic or phosphinic acid at a concentration of about 0.0001 to 0.1 molar until a sufficient amount of the phosphorous-containing compound has reacted with the surface of the metal oxide/hydroxide particle to form the desired monomolecular layer thereon.

Having thus described the invention, what is claimed is:

1. A process for chemically bonding a monomolecular layer of phosphorous-containing organic material to metal oxide/hydroxide particles to form an active material suitable for use as an adsorbent and having good chemical stability over a pH range of from 1 to 14 which comprises:
   (a) providing a liquid containing an organic material therein having 1-2 phosphorous-containing groups thereon selected from the class consisting of:
      (i) phosphonic acid having the formula $RPO(OH)_2$; and
      (ii) phosphinic acid having the formula $RR'PO(OH)$;
      where R comprises a 1-30 carbon-containing group and R′ comprises hydrogen or a 1-30 carbon-containing group; and
   (b) contacting the metal oxide/hydroxide particles with said liquid to chemically bond said phosphorous-containing organic material to all of the exposed hydroxyl groups on the surface of said metal oxide/hydroxide particles to form a monomolecular layer of said organic material thereon forming said active material.

2. The process of claim 1 wherein said step of providing a liquid containing an organic material therein having 1-2 phosphorous-containing groups thereon further comprises maintaining a concentration of said phosphorous-containing organic material in said liquid of at least about 0.1 molar.

3. The process of claim 1 wherein said step of contacting said metal oxide/hydroxide particles with said liquid containing said phosphorous-containing organic material further comprises maintaining said contact for from about 0.1 to about 20 hours.

4. The process of claim 3 wherein said step of contacting said metal oxide/hydroxide particles with said liquid containing said phosphorous-containing organic material further comprises maintaining said contact for from about 0.5 to about 4 hours.

5. The process of claim 1 wherein said step of contacting said metal oxide/hydroxide particles with said liquid containing said phosphorous-containing organic material further comprises maintaining the temperature of the reactants at about 5°–150° C. during said contacting step.

6. A process for chemically bonding a monomolecular layer of phosphorous-containing organic material to metal oxide/hydroxide particles to form an active material suitable for use as an adsorbent and having good chemical stability over a pH range of from 1 to 14 which comprises:

(a) providing a liquid containing an organic material therein having 1–2 phosphorous-containing groups thereon selected from the class consisting of:
  (i) phosphonic acid having the formula $RPO(OH)_2$; and
  (ii) phosphinic acid having the formula $RR'PO(OH)$;
  where R comprises a 1–30 carbon-containing group and R' comprises hydrogen or a 1–30 carbon-containing group;

(b) maintaining said liquid containing said phosphorous-containing organic material at a concentration of at least about 0.0001 to 0.1 molar; and (c) contacting the metal oxide/hydroxide particles with said liquid at a temperature of from about 25°–90° C. for a period of from at least 0.1 to about 20 hours to chemically bond said phosphorous-containing organic material to all of the exposed hydroxyl groups on the surface of said metal oxide/hydroxide particles to form a monomolecular layer of said organic material thereon comprising said active material;

whereby said surface of said metal oxide/hydroxide particles is substantially free of unreacted hydroxyl groups after said chemical bonding, said active material is stable at a pH of from 1–14, and said active material is insoluble in aqueous media.

7. The process of forming said active material of claim 6 wherein said metal oxide/hydroxide particles have a particle size range of from 50 Angstroms up to 12 millimeters.

8. The process of forming said active material of claim 7 wherein said particle size range of said metal oxide/hydroxide particles is from about 1 to about 200 microns.

9. The process of forming said active material of claim 6 wherein said metal oxide/hydroxide particles comprise porous particles having an average pore size of from about 20 Angstroms to about 10 microns in diameter.

10. The process of forming said active material of claim 9 wherein said porous metal oxide/hydroxide particles have a pore volume of from about 0.1 to about 1.5 ml/gram.

11. The process of forming said active material of claim 10 wherein said porous metal oxide/hydroxide particles have a surface area of from about 0.10 to about 1000 $m^2$/gram.

12. The process of forming said active material of claim 6 wherein said metal oxide/hydroxide particles comprise an oxide/hydroxide of an element capable of forming an oxide/hydroxide selected from the class consisting of group IB, group IIA, group IIB, group IIIA, IVA, VA, group IIIB, group IVA, group IVB, group VB, group VIB, group VIIB, and group VIII metals; lanthanide series; silicon, boron, selenium, arsenic and tellurium.

13. The process of forming said active material of claim 12 wherein said metal oxide/hydroxide particles comprise an oxide/hydroxide of a metal selected from the class consisting of aluminum, magnesium, titanium, zirconium, iron, silicon, chromium, zinc, vanadium, and combinations of these metals.

14. The process of forming said active material of claim 12 wherein said metal oxide/hydroxide particles are selected from the class consisting of alumina, iron oxide, silica, zeolitic materials, zirconia, zinc oxide, magnesia, apatites, and hydrotalcites.

15. The process of forming said active material of claim 14 wherein said metal oxide/hydroxide particles comprise alumina.

16. The process of forming said active material of claim 15 wherein said alumina comprises activated alumina having a surface area in the range of 0.1 to 600 $m^2$/g.

17. The process of forming said active material of claim 15 wherein said alumina has a particle size in the range of 50 Angstroms to 12 mm.

18. The process of forming said active material of claim 6 wherein the thickness of said substantially monomolecular layer of phosphorous-containing organic material chemically bonded to said metal oxide/hydroxide particles is in the range of 10 to 5,000 Angstroms.

19. The process of forming said active material of claim 6 wherein the thickness of said monomolecular layer of phosphorous-containing organic material chemically bonded to said metal oxide/hydroxide particles is in the range of 20 to 500 Angstroms.

20. The process of forming said active material of claim 6 wherein said R group of said organic molecule contains at least 5 carbon atoms.

21. The process of forming said active material of claim 6 wherein said monomolecular layer constitutes 0.01 to 90 wt.% of said active material comprising said phosphorous-containing organic material chemically bonded to said metal oxide/hydroxide particles.

22. The process of forming said active material of claim 6 wherein said monomolecular layer constitutes about 4 to 50 wt.% of said active material comprising said phosphorous-containing organic material chemically bonded to said metal oxide/hydroxide particles.

23. The process of forming said active material of claim 20 comprising the further step of treating said reactive material, comprising said metal oxide/hydroxide particles having chemically bonded thereto said phosphorous-containing organic material containing at least 5 carbon atoms, with a second liquid having a phosphorous-containing organic material therein selected from the class consisting of;

(a) phosphonic acid having the formula $RPO(OH)_2$; and (b) phosphinic acid having the formula $RR'PO(OH)$; where R comprises a 1-5 carbon group and R' comprises hydrogen or a 1-5 carbon group; said further treatment step acting to react said phosphorous-containing organic material in said second liquid with any remaining surface hydroxyl groups on the surface of said metal oxide/hydroxide particle not reacted in said first treatment.

24. An active material comprising a metal oxide/hydroxide particle having chemically bonded to reactive sites on a surface thereof, a monomolecular layer of a phosphorous-containing organic material suitable for use as an adsorbent and selected from the class consisting of phosphonic acid having the formula $RPO(OH)_2$ and phosphinic acid having the formula $RR'PO(OH)$ where R comprises a 1-30 carbon-containing group and R' comprises hydrogen or a 1-30 carbon-containing group, said bond being formed by reaction of said phosphorous-containing group with said metal oxide/hydroxide surface, said carbon-containing group being oriented away from said metal oxide/hydroxide surface.

25. The active material of claim 24 wherein said metal oxide/hydroxide comprises particles having a particle size range of from 50 Angstroms up to 12 millimeters.

26. The active material of claim 25 wherein said particle size range of said metal oxide/hydroxide particles is from about 1 to about 200 microns.

27. The active material of claim 25 wherein said metal oxide/hydroxide particles comprise porous particles having an average pore size of from about 1 to about 200 microns in diameter.

28. The active material of claim 27 wherein said porous metal oxide/hydroxide particles have a pore volume of from about 0.1 to about 1.5 ml/gram.

29. The active material of claim 27 wherein said porous metal oxide/hydroxide particles have a surface area of from about 0.10 to about 1000 $m^2$/gram.

30. The active material of claim 25 wherein said metal oxide/hydroxide particles comprise an oxide/hydroxide of an element capable of forming an oxide/hydroxide selected from the class consisting of group IB, group IIA, group IIB, group IIIA, IVA, VA, group IIIB, group IVB, group VB, group VIB, group VIIB, and group VIII metals; lanthanide series; silicon, thorium, boron, uranium, selenium, arsenic and tellurium.

31. The active material of claim 30 wherein said metal oxide/hydroxide particles comprises an oxide/hydroxide of a metal selected from the class consisting of aluminum, magnesium, titanium, zirconium, iron, silicon, chromium, zinc, vanadium, and combinations of these metals.

32. The active material of claim 30 wherein said metal oxide/hydroxide particles are selected from the class consisting of alumina, iron oxide, silica, zeolitic materials, zirconia, zinc oxide, magensia, apatites, and hydrotalcites.

33. The active material of claim 32 wherein said metal oxide/hydroxide particles comprise alumina.

34. The active material of claim 33 wherein said alumina comprises activated alumina having a surface area in the range of 0.1 to 600 $m^2/g$.

35. The active material of claim 33 wherein said alumina has a particle size in the range of 50 Angstroms to 12 millimeters.

36. The active material of claim 25 wherein the thickness of said monomolecular layer of phosphorous-containing organic material chemically bonded to said metal oxide/hydroxide particles is in the range of 10 to 5,000 Angstroms.

37. The active material of claim 36 wherein the thickness of said monomolecular layer of phosphorous-containing organic material chemically bonded to said metal oxide/hydroxide particles is in the range of 20 to 500 Angstroms.

38. The active material of claim 25 wherein said R group of said phosphorous-containing organic molecule contains at least 5 carbon atoms.

39. The active material of claim 24 wherein either said R group or said R' group may comprise an organic radical selected from the class consisting of long and short chain aliphatic hydrocarbons, aromatic hydrocarbons, carboxylic acids, aldehydes, ketones, amines, amides, thioamides, imides, lactams, anilines, pyridines, piperidines, carbohydrates, esters, lactones, ethers, alkenes, alkynes, alcohols, nitriles, oximes, organosilicones, ureas, thioureas, perfluoro organic molecules, perchloro organic molecules, perbromo organic molecules and combinations of these groups.

40. The active material of claim 39 wherein either said R group or said R' group may have a functional group attached to a portion of said molecule spaced from said phosphorous-containing group on said molecule selected from the class consisting of a carboxyl group, a glucose group, a cyano group, a cyanate group, isocyanate group and thiocyanate group, a phenyl group, a diphenyl group, a tertiary butyl group, a sulfonic group, a benzyl sulfonic group, a halogen group, nitrate group, phosphate group, phosphinate group, phosphinite group, phosphonate group, quaternary ammonium salt group and combinations of these groups.

41. The active material of claim 39 wherein either said R group or said R' group may have a cation exchange functional group attached to a portion of said molecule spaced from said phosphorous-containing group on said molecule and selected from the class consisting of $-HSO_3$, $-N(CH_3)_3Cl$, $-COONa$, $-NH_2$ and $-CN$.

42. The active material of claim 25 wherein said monomolecular layer of organic material having a phosphorous-containing group is substantially free of hydroxyl groups after chemically bonding to said metal oxide/hydroxide particles.

43. The active material of claim 25 wherein said monomolecular layer constitutes 0.01 to 90 wt.% of said reactive material comprising said phosphorous-containing organic material chemically bonded to said metal oxide/hydroxide particles.

44. The active material of claim 43 wherein said monomolecular layer constitutes about 4 to 50 wt.% of said reactive material comprising said phosphorous-containing organic material chemically bonded to said metal oxide/hydroxide particles.

45. An active material suitable for use as an adsorbent and capable of reacting with, attracting, coupling to, or bonding with other atoms, ions, and/or molecules comprising:

(a) metal oxide/hydroxide particles consisting essentially of an oxide/hydroxide of an element capable of forming an oxide/hydroxide selected from the class consisting of group IB, group IIA, group IIB, group IIIA, IVA, VA, group IIIB, group IVA, group IVB, group VB, group VIB, group VIIB, and group VIII elements; lanthanide series; selenium, silicon, boron, arsenic, thorium, uranium and tellurium; and (b) chemically bonded to reactive sites on a surface of said metal oxide/hydroxide particles, a monomolecular layer of a phosphorous-containing organic material comprised of a phosphorous-containing group and a carbon-containing group and selected from the class consisting of phosphonic acid having the formula RPO(OH) and phosphinic acid having the formula RR'PO(OH) wherer R comprises a 1-30 carbon-containing group and $R^1$ comprises hydrogen or a 1-30 carbon-containing group;

said bond being formed by reaction of said phosphorous-containing group with said metal oxide/hydroxide particle surface, said carbon-containing group being oriented away from said metal oxide/hydroxide particle surface.

46. The active material of claim 45 wherein said R group on said phosphorous-containing organic material comprises a monomer and said R' group, when present, is hydrogen or a monomer.

47. The active material of claim 45 wherein said R group of said phosphorous-containing organic material is an oligomer containing 2-4 monomers and having a molecular weight of less than 2000.

48. A process for chemically bonding a monomolecular layer of phosphorous-containing organic material to a metal oxide/hydroxide particle to form an active material suitable for use as an adsorbent and having good chemical stability over a pH range of from 1 to 14 which comprises:

(a) providing a liquid containing an organic material therein having 1-2 phosphorous-containing groups thereon selected from the class consisting of:
  (i) phosphonic acid having the formula RPO(OH)$_2$; and
  (ii) phosphinic acid having the formula RR'PO(OH);
  where R comprises a 1-30 carbon-containing group and R' comprises hydrogen or a 1-30 carbon-containing group; and (b) treating the metal oxide/hydroxide particle with said liquid to form said active material by chemically bonding said phosphorous-containing organic material to substantially all of the exposed hydroxyl groups on the surface of said metal oxide/hydroxide particle to form a monomolecular layer of said organic material thereon wherein said phosphonic or phosphinic acid molecules are bonded to said metal oxide/hydroxide particle to form said monomolecular layer;

whereby the surface chemistry of said metal oxide/hydroxide particle is changed by the reaction of substantially all of the hydroxy groups on the surface with said phosphorous-containing organic material to form said monomolecular layer to render the resultant active material stable at a pH of from 1-14 and insoluble in aqueous media.

49. The process of claim 48 wherein said step of treating said metal oxide/hydroxide particle with said liquid to form said active material by chemically bonding said phosphorous-containing organic material to substantially all of the exposed hydroxyl groups on the surface of said metal oxide/hydroxide particle to form a monomolecular layer of said organic material thereon further comprises the step of treating said metal oxide/hydroxide particle with a phosphorous-containing organic material comprising a monomer or oligimer having 5 to 30 carbon atoms followed by a second treatment with a phosphorous-containing organic material comprising a monomer or oligimer having less than 6 carbon atoms so that substantially all of the reactive sites on said metal oxide/hydroxide particle are capped or blocked.

50. The process of claim 49 including the further step of treating the reacted material with a material selected from the class consisting of an organic solvent, an acid, a base, and a combination thereof capable of removing weakly adsorbed molecules on the reacted material to assure formation of the desired monomolecular layer of phosphorous-containing organic material over said metal oxide/hydroxide particle.

51. The process for forming an active material suitable for use as an adsorbent of claim 48 wherein 90% of said phosphonic or phosphinic acid molecules are bonded to said metal oxide/hydroxide particle to form said monomolecular layer.

52. The process for forming an active material suitable for use as an adsorbent of claim 48 wherein 98% of said phosphonic or phosphinic acid molecules are bonded to said metal oxide/hydroxide particle to form said monomolecular layer.

* * * * *